United States Patent Office 3,625,650
Patented Dec. 7, 1971

3,625,650
PREPARATION OF TITANIUM DIOXIDE PIGMENT HAVING THE CRYSTAL STRUCTURE OF ANATASE
John J. Libera, Affton, and Eckard J. Puetz, Lemay, Mo., assignors to NL Industries, Inc., New York, N.Y.
No Drawing. Filed Aug. 27, 1969, Ser. No. 853,479
Int. Cl. C01g 23/04, 23/06, 23/08
U.S. Cl. 23—202 R
2 Claims

ABSTRACT OF THE DISCLOSURE

This invention relates in general to a process for preparing a high quality titanium dioxide pigment in which the titanium dioxide is in the anatase crystal form. The process comprises hydrolyzing in a particular manner the titanium values from a titanium sulfate-ferrous sulfate solution in which the concentration of titanium is from 80 to 180 g.p.l. calculated as $TiO_2$ and treating and calcining the hydrate so formed to produce a high grade anatase $TiO_2$ pigment. Using the hydrolysis process of the instant invention, a high grade anatase titanium dioxide pigment may be produced from a titanium sulfate-ferrous sulfate solution without utilizing the conventional crystallization step for removing most of the iron values nor the concentration step for increasing the titanium content in the liquor to at least 200 g.p.l. $TiO_2$.

BACKGROUND OF THE INVENTION

Titanium dioxide pigments are generally produced commercially according to the prior art processes by the so-called "sulfate process" in which a titaniferous material, such as a titaniferous iron ore, ore concentrate or a titanium slag is heated at elevated temperatures, with concentrated sulfuric acid to form a porous cake, sometimes referred to in the art as "digestion cake." The digestion cake is allowed to cure so as to effect maximum recoveries of titanium values upon dissolving. After curing the cake is dissolved in water or weak acid, with agitation to form a solution of titanium sulfate and iron sulfates. The ferric sulfate values in the solution are converted to ferrous sulfate by the addition, to the solution, of a reducing agent, such as scrap iron with or without antimony oxide. The solution is then clarified by settling and filtration to remove all of the solid material contained in the solution with minimum loss of $TiO_2$.

Following clarification the solution is then usually subjected to a crystallization step to remove most of the ferrous sulfate values as copperas, i.e. $FeSO_4 \cdot 7H_2O$.

After cystallization the titanium sulfate solution is subjected to concentration to remove water from the solution. This is accomplished by evaporation in concentrators which operate under vacuum and at elevated temperatures. Concentration is continued until the specific gravity of the solution is at least 1.5 with a $TiO_2$ content of at least 200 grams per liter and preferably from 250–300 grams per liter.

The concentrated titanium sulfate solution is then converted by hydrolysis, from the soluble state into insoluble $TiO_2$ hydrate and in general this change is effected through dilution of the concentrated titanium sulfate-ferrous sulfate solution with $H_2O$ at elevated temperatures. Thus a predetermined amount of titanium sulfate-ferrous sulfate solution having a $TiO_2$ content of at least 200 grams per liter is preheated to a temperature of at least 90° C. and added with agitation to clear water at substantially the same temperature and in the ratio of 3–19 parts solution to one part water. During subsequent boiling, the precipitated $TiO_2$ forms initially as colloidal particles, which subsequently floc to produce a filterable $TiO_2$ hydrate containing from 30% to 36% solids.

High quality titanium dioxide pigments have been made from hydrates produced from clarified, concentrated and crystallized titanium sulfate solutions. However the above described hydrolysis procedure cannot be employed to produce satisfactory hydrates when a clarified but unconcentrated and uncrystallized titanium sulfate-ferrous sulfate solution is used.

SUMMARY OF THE INVENTION

A high quality titanium dioxide pigment having the crystal structure of anatase may be produced by the process of the instant invention which utilizes a novel hydrolysis procedure which employs a clarified but uncrystallized and unconcentrated titanium sulfate-ferrous sulfate solution having a titanium concentration from 80 to 180 g.p.l. $TiO_2$, a $FeSO_4/TiO_2$ ratio from 2.20 to 2.75 and a $H_2SO_4/TiO_2$ ratio from 1.70 to 2.30.

The process comprises the following steps:

(1) provide a measured quantity of the above clarified, uncrystallized and unconcentrated titanium sulfate-ferrous sulfate solution at a temperature from 40° C. to 70° C.;
(2) add water to a tank in which the hydrolysis will take place, the quantity of water being from 5% to 20% of the volume of the said measured quantity of titanium solution to be hydrolyzed;
(3) heat the water and agitate to obtain a temperature from 80° C. to 98° C.
(4) add from 1% to 5% of the total amount of said measured quantity of titanium solution to the water over a period of 60 to 120 seconds;
(5) add the remainder of the said measured quantity of titanium solution into the tank over a period from 20 to 60 minutes;
(6) maintain the temperature of the mixture between 75° C. and 85° C. during the addition period;
(7) raise the temperature of the mixture to a boil within 20 minutes to 70 minutes at the end of the addition period;
(8) boil the mixture gently from 2 to 4 hours;
(9) filter and thoroughly wash the precipitated titanium hydrate;
(10) bleach the washed hydrate to reduce the ferric iron values to the ferrous state and after filtering and washing;
(11) add water to form a titanium hydrate slurry;
(12) treat the slurry with salts of potassium and phosphorous in amount equivalent to 0.3–0.5% $K_2O$ and 0.4–0.8% $P_2O_5$ on a $TiO_2$ weight basis, the mole proportions of $K_2O:P_2O_5$ being from 0.9–1.3:1.0;
(13) calcine the dewatered slurry at a temperature between 850° C. and 1000° C. to form anatase $TiO_2$ having a spectral characteristic of at least 3.5;

(14) and milling the calciner discharge to form said anatase pigment.

DESCRIPTION OF THE PREFERRED EMBODIMENT

When using the instant hydrolysis process for hydrolyzing a clarified but uncrystallized, unconcentrated solution, the titanium hydrate formed apparently possesses the necessary crystallite and floc sizes so that upon treatment and calcination the anatase $TiO_2$ pigment formed possesses the superior pigment properties.

This particular hydrolysis process does not require a separately prepared seed or nucleating agent since the seed is prepared in situ as the hydrolysis is carried out. In this method it is not necessary to buy relatively pure and costly alkali metal compounds which are needed to prepare the nucleating agent.

Pigment properties were determined as follows:

The tinting strength was determined by the well-known Reynolds' Tinting Strength Method as described in Physical and Chemical Examination of Paints, Varnishes, Lacquers, and Colors by H. V. Gardner, Ninth Edition, May 1939, page 37.

The color brightness and tone were determined by the following methods:

Color brightness and tone of pigment

This test determined instrumentally the brightness and tone of the titanium dioxide pigment in a wet film of alkyd vehicle. The pigment was dispersed in a soya alkyd vehicle and the green, red and blue reflectance values of the wet film were measured. The green reflectance value was taken as a measurement of the brightness of the pigment and the blue minus red reflectance values as a measure of the color tone. The determinations were made on a Colormaster differential colorimeter manufactured by Manufacturers Engineering and Equipment Corp., Hatboro, Pa.

The pigment was mixed with a soya alkyd resin to form a paste and the paste was applied to the surface of a high reflectance white ceramic panel, the thickness of the paste film being sufficient to eliminate the background color. The green, red and blue reflectance values of the film were read on the Colormaster and the reflectances were recorded as percent reflectance.

The spectral characteristic of the pigment was determined as follows:

Spectral characteristics of pigment in a paint vehicle

The pigment was mixed with a soya alkyd vehicle containing carbon black and the mixture was formed into a paste. The ratio of the pigment to carbon black present in the paste was 5 to 0.15. The paste was then spread onto a lacquered sheet and the wet film was immediately tested in the Colormaster colorimeter described above. The blue and red reflectance values were obtained. The spectral characteristics of the pigment was measured by comparing the result obtained by subtracting the red from the blue reflectance values and comparing this result with the spectral characteristics of a standard pigment previously determined.

In order to describe more fully the process of the instant invention, the following examples are presented:

EXAMPLE 1

200 cu. ft. of water heated to 91° C. were placed into a precipitation tank. With agitation 40 cu. ft. of clarified but uncrystallized, unconcentrated titanium sulfate-ferrous sulfate solution heated to 57° C. were added to the water within 90 seconds. 40 cu. ft. of the sulfate solution represents 2% of the total amount of solution to be hydrolyzed. The solution employed had the following analysis:

| | |
|---|---|
| Specific gravity at 60° C. | 1.530 |
| $TiO_2$ (percent) | 8.6 |
| $H_2SO_4$ (percent) (to methyl orange) | 16.5 |
| $FeSO_4$ (percent) | 20.0 |
| $H_2SO_4/TiO_2$ | 1.88 |
| $FeSO_4/TiO_2$ | 2.48 |
| Red. $TiO_2$, g.p.l. | 3.0 |

Immediately after the initial solution had been added, the remaining solution of 1960 cu. ft. was added to the tank over a period of 37 minutes.

Steam was turned on after 3 minutes to keep the temperature in the hydrolysis tank above 75° C. In this particular hydrolysis the temperature of the solution at the end of the drop was 84° C. and the solution was heated to boiling temperature with steam in 31 minutes.

The solution was boiled for 3 hours after which the precipitated hydrate was allowed to settle, the liquor removed and the hydrate was washed and bleached thoroughly to remove the iron and other coloring impurities. In this particular example the iron in the hydrate was reduced to 0.003% $Fe_2O_3$ which is below the upper limit of 0.005% $Fe_2O_3$.

The washed and bleached titanium hydrate was then slurried with water to obtain 30% solids. The slurry was then treated with 0.45% $K_2O$ (added as 10% $K_2SO_4$ solution) and 0.65% $P_2O_5$ (added as 75% $H_3PO_4$) the percentages based on the amounts retained in the hydrate and based on the weight of $TiO_2$ in the slurry. After agitating the treated slurry for one hour, the slurry was filtered and the treated hydrate was introduced into the calciner.

The hydrate was calcined for 100 minutes at 950° C. after which the calcined $TiO_2$ was thoroughly milled. The milled pigment had the following properties:

| | |
|---|---|
| Percent reflectance | 95.8 |
| Tone | −3.7 |
| Reynolds tinting strength | 1250 |
| Spectral characteristics | 4.6 |

EXAMPLES 2–6

A series of hydrolyses were carried out using the solution described in Example 1 except that slight variations were made in the hydrolysis process employed. In Examples 2, 3 and 6 the time of addition of the initial solution was 90 seconds instead of 80. The amounts of $K_2O$ and $P_2O_5$ added in Examples 2 and 6 were 0.34% and 0.4% respectively instead of 0.45% and 0.65%. 180 cu. ft. of water were used in Examples 4–6. The hydrates formed in Examples 3 and 5 were aged for 9 and 8 days respectively before treating and calcining. In all of these examples however the hydrolysis process of Example 1 was substantially repeated.

The operational details and the results obtained on each of these examples along with those of Example 1 are recorded in the following table.

EXAMPLES 7–8

In these examples the procedure of Example 1 was used except that the precalcination treatments were reduced below the lower limits contemplated by the instant invention. The results are recorded in the table and they clearly show that the tinting strengths and spectral characteristics are reduced considerably.

TABLE

|  | Example Number | | | | | | | |
|---|---|---|---|---|---|---|---|---|
|  | 1 | 2 | 3 | 4 | 5 | 6 | 7 | 8 |
| Hydrolysis: | | | | | | | | |
| Amount of $H_2O$ used, cu. ft | 200 | 200 | 200 | 180 | 180 | 180 | 200 | 200 |
| Temperature of $H_2O$, °C | 91 | 91 | 90 | 89 | 91 | 91 | 90 | 90 |
| Amount of solution added initially, cu. ft | 40 | 40 | 40 | 40 | 40 | 40 | 40 | 40 |
| Temperature of solution, °C | 57 | 57 | 57 | 55 | 57 | 57 | 50 | 50 |
| Time of addition, sec | 80 | 90 | 90 | 80 | 80 | 90 | 80 | 80 |
| Amount of remaining solution added, cu. ft | 1,960 | 1,960 | 1,960 | 1,960 | 1,960 | 1,960 | 1,960 | 1,960 |
| Temperature of mixture, °C | 84 | 84 | 85 | 83 | 84 | 84 | 81 | 81 |
| Time of addition, min | 37 | 37 | 33 | 39 | 37 | 37 | 37 | 37 |
| Time to heat mixture to boil, min | 31 | 31 | 31 | 35 | 31 | 31 | 44 | 44 |
| Time to boil, hrs | 3 | 3 | 3 | 3 | 3 | 3 | 3 | 3 |
| Treating agents: | | | | | | | | |
| $K_2O$, percent | 0.45 | 0.34 | 0.45 | 0.45 | 0.45 | 0.34 | 0.20 | 0.18 |
| $P_2O_5$, percent | 0.65 | 0.40 | 0.65 | 0.65 | 0.65 | 0.40 | 0.25 | 0.30 |
| Calcination: | | | | | | | | |
| Temperature, °C | 950 | 950 | 950 | 950 | 950 | 950 | 940 | 940 |
| Time, min | 100 | 100 | 100 | 100 | 100 | 100 | 100 | 100 |
| Pigment properties: | | | | | | | | |
| Reflectance, percent | 95.8 | 95.2 | 96.3 | 95.6 | 95.9 | 94.3 | 94.3 | 93.7 |
| Tone | −3.7 | −4.1 | −4.1 | −3.8 | −4.1 | −3.9 | −4.4 | −4.3 |
| Reynolds tinting strength | 1,250 | 1,275 | 1,250 | 1,300 | 1,275 | 1,225 | 1,000 | 1,000 |
| Spectral characteristics | 4.6 | 3.6 | 5.2 | 4.7 | 4.4 | 4.2 | 2.4 | 2.0 |

While this invention has been described and illustrated by the examples shown, it is not intended to be strictly limited thereto, and other variations and modifications may be employed within the scope of the following claims.

We claim:

1. In a process for producing a titanium dioxide pigment having the crystal structure of anatase which employs an uncrystallized and unconcentrated titanium sulfate-ferrous sulfate solution, said solution having a titanium concentration from 80 to 180 g.p.l. $TiO_2$, an $FeSO_4/TiO_2$ ratio from 2.20 to 2.75 and an $H_2SO_4/TiO_2$ ratio from 1.70 to 2.30, the improvement which comprises: adding water to a tank in which the hydrolysis will take place, the quantity of water being from 5% to 15% of the volume of the titanium solution to be hydrolyzed, heating the water with agitation to obtain a temperature from 80° C. to 98° C., adding from 1% to 5% of the total amount of titanium solution to the water over a period of 60 to 120 seconds, adding the remainder of the titanium solution into the tank over a period from 20 to 60 minutes, maintaining the temperature of the mixture above 75° C. during the addition period, the temperature of the mixture rising to above 80° C., raising the temperature of the mixture to a boil within 20 minutes to 50 minutes after the end of the addition period, boiling gently the mixture from 2 to 4 hours to precipitate the titanium hydrate, filtering and washing the titanium hydrate to remove most of the iron values, bleaching the washed titanium hydrate to reduce the ferric iron values to the ferrous state and filtering and washing the hydrate again to remove most of the ferrous iron values, adding water to the washed titanium hydrate to form a titanium hydrate slurry, treating the slurry with salts of potassium and phosphorus in amount equivalent to 0.3–0.5 $K_2O$ and 0.4–0.8 $P_2O_5$ on a $TiO_2$ weight basis, the mole proportions of $K_2O:P_2O_5$ being from 0.9–1.3:1.0, calcining the dewatered slurry at a temperature from 850–1000° C. to form anatase $TiO_2$ having a spectral characteristic of at least 3.5 and milling the calciner discharge to form said anatase pigment.

2. A process for producing a high quality titanium dioxide pigment having the crystal structure of anatase which comprises providing an uncrystallized and unconcentrated titanium sulfate-ferrous sulfate solution at temperature of 40–70° C., having a titanium concentration from 80 to 180 g.p.l. $TiO_2$, an $FeSO_4/TiO_2$ ratio from 2.20 to 2.75 and an $H_2SO_4/TiO_2$ ratio from 1.70 to 2.30, adding water to a tank in which the hydrolysis of said titanium solution will take place, the quantity of water being from 5% to 15% of the volume of the titanium solution to be hydrolyzed, heating the water with agitation to obtain a temperature from 80° C. to 98° C., adding from 1% to 5% of the total amount of titanium solution to the water over a period of 60 to 120 seconds, adding the remainder of the titanium solution into the tank over a period of from 20 to 60 minutes, maintaining the temperature of the mixture between 75° C. and 85° C., during the addition period, raising the temperature of the mixture to a boil within 20 minutes to 50 minutes after the end of the addition period, boiling gently the mixture from 2 to 4 hours, to precipitate the titanium hydrate filtering and washing the titanium hydrate to remove most of the iron values, bleaching the washed titanium hydrate to reduce the ferric iron values to the ferrous state and filtering and washing the hydrate again to remove the soluble ferrous iron values, adding water to the washed titanium hydrate to form a titanium hydrate slurry, treating the slurry with salts of potassium and phosphorus in amount equivalent to 0.3–0.5 $K_2O$ and 0.4–0.8 $P_2O_5$ on a $TiO_2$ weight basis, the mole proportions of $K_2O:P_2O_5$ being from 0.9–1.3:1.0, calcining the dewatered slurry at a temperature from 850–1000° C. to form anatase $TiO_2$ having a spectral characteristic of at least 3.5 and milling the calciner discharge to form said anatase pigment.

References Cited

UNITED STATES PATENTS

| 2,273,431 | 2/1942 | Booge | 23—202 |
| 2,342,483 | 2/1944 | Olson | 23—202 |
| 2,486,465 | 11/1949 | Copeland et al. | 23—202 |
| 2,516,548 | 7/1950 | Cauwenberg et al. | 23—202 |
| 2,999,011 | 9/1961 | Olmsted et al. | 23—202 |
| 3,062,673 | 11/1962 | Wigginton | 23—202 |
| 3,071,439 | 1/1963 | Solomka | 23—202 |
| 3,337,300 | 8/1967 | Hughes | 23—202 |
| 3,403,977 | 10/1968 | Heywood et al. | 23—202 |
| 3,518,053 | 6/1970 | Kolznak et al. | 23—202 |

EDWARD STERN, Primary Examiner

U.S. Cl. X.R.

106—300